W. BLANKNER.
ICE MACHINE.
APPLICATION FILED OCT. 6, 1914.
1,156,832.
Patented Oct. 12, 1915.
3 SHEETS—SHEET 1.
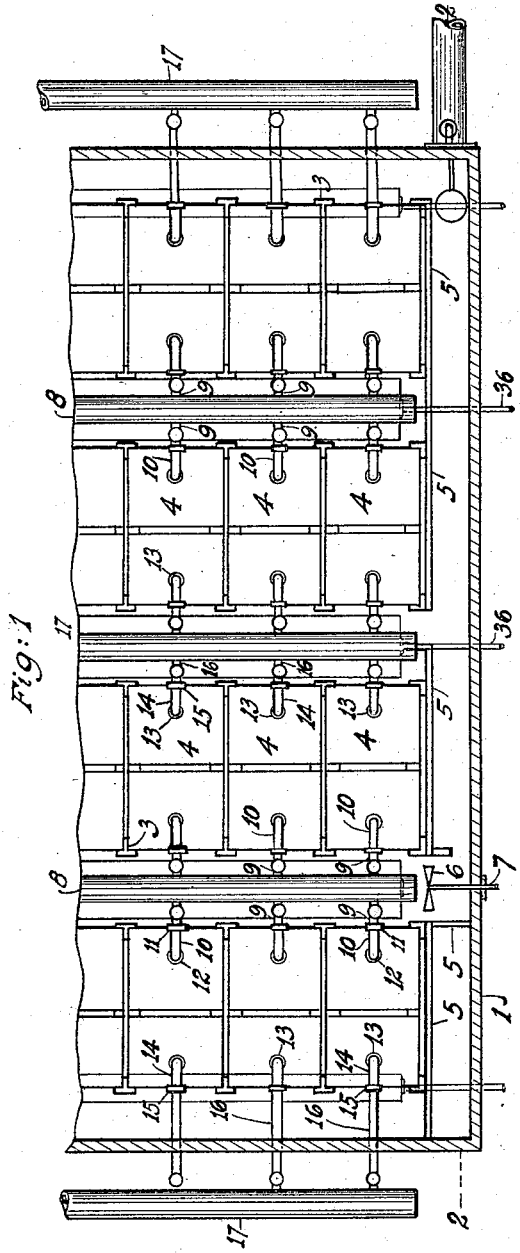
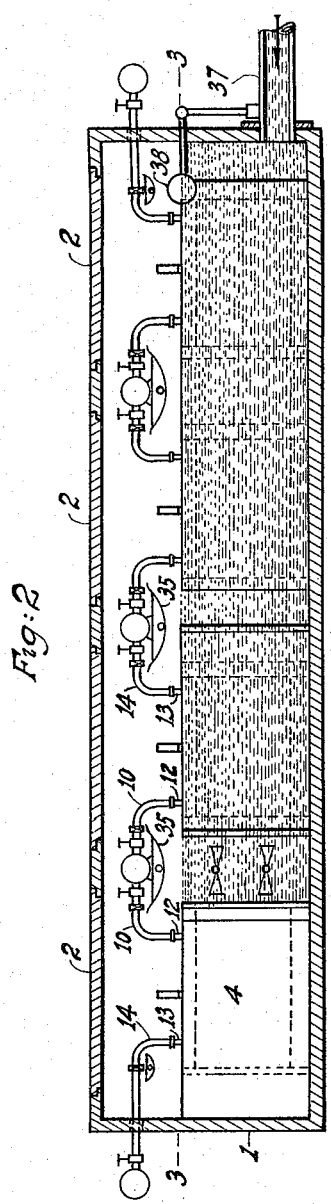
WITNESSES
INVENTOR
BY
ATTORNEY W. BLANKNER.
ICE MACHINE.
APPLICATION FILED OCT. 6, 1914.
1,156,832.
Patented Oct. 12, 1915.
3 SHEETS—SHEET 2.
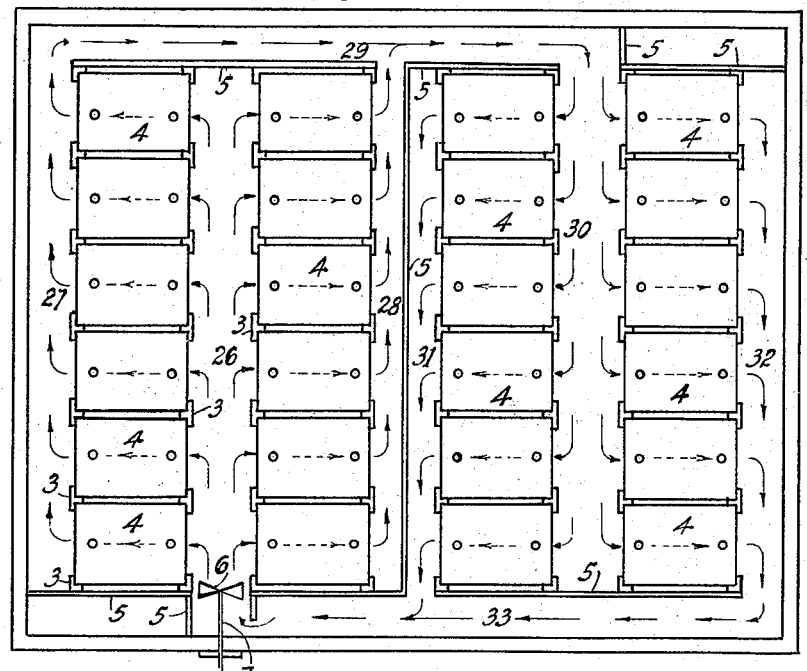
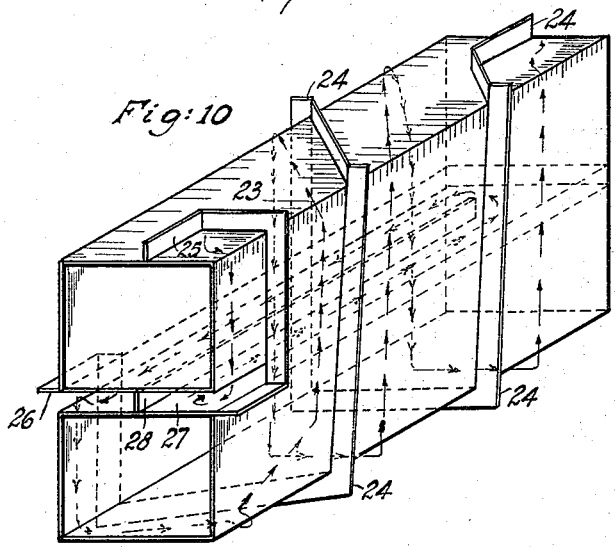
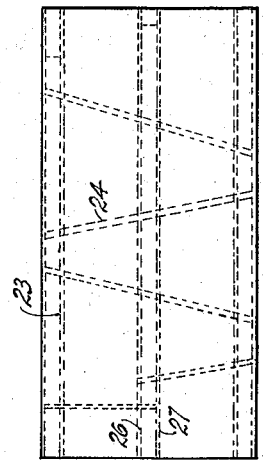
WITNESSES
INVENTOR
William Blankner
BY
Francis C. Lowthorp,
ATTORNEY

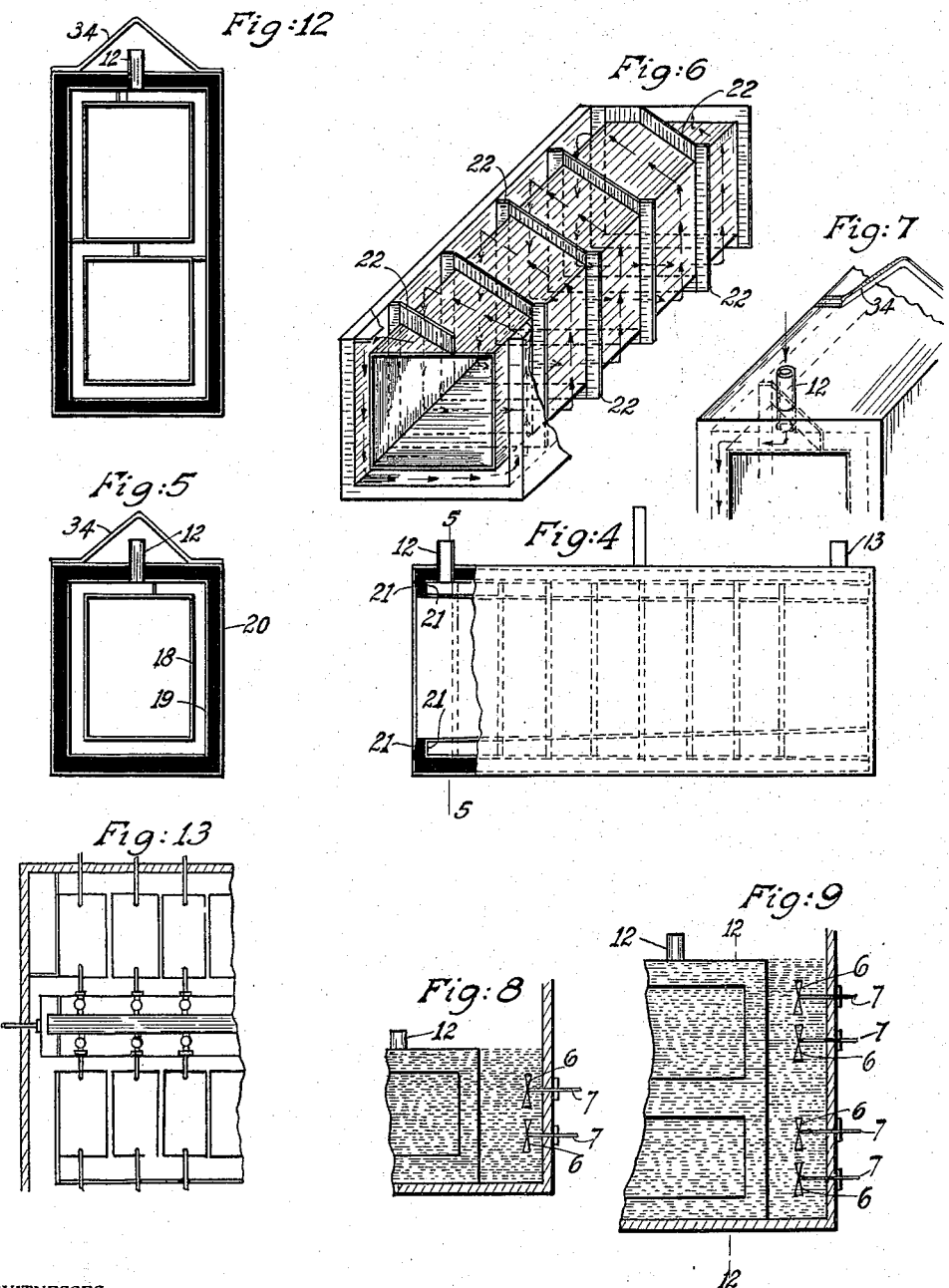

UNITED STATES PATENT OFFICE.

WILLIAM BLANKNER, OF CLEVELAND, OHIO, ASSIGNOR OF ONE-HALF TO CHARLES G. URSHEL, OF TRENTON, NEW JERSEY.

ICE-MACHINE.

1,156,832.  Specification of Letters Patent.  Patented Oct. 12, 1915.

Application filed October 6, 1914. Serial No. 865,253.

*To all whom it may concern:*

Be it known that I, WILLIAM BLANKNER, a citizen of the United States, residing at Cleveland, in the county of Cuyahoga, in the State of Ohio, have invented a new and useful Improvement in Ice - Machines, of which the following is a specification.

My invention relates to apparatus for the manufacture of artificial ice, and has for its object the provision of simple means for the refrigerating process by which water is converted into ice, by the use whereof, more or less complicated apparatus now commonly in use, may be omitted, and the process of refrigeration more expeditiously effected.

As is well known, artificial ice is formed in metal molds which are exposed to a refrigerant, commonly chilled brine; the heat taken up by the brine from the water within the molds, through the walls thereof, being continuously removed from the brine by passing the brine through a cooling apparatus, in which ammonia-gas is commonly used as a cooling agent. Heretofore, the water to be congealed has been placed in metal molds, and there retained until the congelation thereof has extended inwardly from the walls of the molds exposed to the refrigerant, to the middle of the molds. As is also well known, when water at or below a freezing temperature is gently agitated or kept in motion, such impurities as are contained in the water, are not taken up and held by the congealed portion of the water, but remain in the water which continues in a liquid condition, and when, in the manufacture of artificial ice, the water within the molds has congealed to a point near the middle of the mold, an open passage through the block of ice remains, which is called the "core." The residuum of uncongealed water is then withdrawn from the mold, carrying with it such impurities as have been contained in the water, and a fresh supply of water, sufficient to fill the core, is poured into the mold, and the process of refrigeration is continued until the block of ice becomes entirely solid. To keep the water in the mold in such a state of agitation as will prevent the impurities contained therein becoming incorporated in the congealed portion of the water, air is admitted to the mold by means of pipes connected with an air pump or blower, which forces a slight current of air through the pipes and through the water in the mold. The effect of this agitation of the water is not only to prevent the incorporation in the ice being formed of impurities in suspension in the water, but it also aids in the production of a clear and transparent ice cake, which would otherwise be clouded and opaque. The objections to this process are two-fold. First, the air passed into the water is ordinarily warmer than the water, and adds heat to the water in the mold, thus requiring a longer process of refrigeration to expel and overcome the heat conveyed into the water than would otherwise be necessary; and, second, more or less complicated mechanism must always be used for the purpose of forcing the air through the water in the molds.

The object of my invention is to provide molds for the forming of artificial ice cakes, through or between the walls of which the refrigerant may be circulated, and to afford means for forcing a slow current of water to be congealed through the molds themselves, thereby preventing the incorporation in the ice being formed of such impurities as may be in suspension in the water used, and also avoiding the mingling with the water to be congealed of air of a temperature higher than that of the water being treated. It will thus be seen that I provide apparatus for freezing the water in a manner which approximates more nearly to the natural process of congelation than anything heretofore devised, and that by avoiding the use of air of a higher temperature than that of the water to agitate the water, I secure a readier and more rapid congelation of the water used.

I will now describe my invention with reference to the accompanying drawings, forming a part of this specification, in which—

Figure 1 is a plan view of a portion of a tank inclosing a series of my refrigerating molds, and disclosing the connections thereof; Fig. 2 is a vertical cross-sectional view of the apparatus disclosed in Fig. 1, taken on the line 2—2 of Fig. 1; Fig. 3 is a plan view of the construction shown in Figs. 1 and 2, taken on the line 3—3 in Fig. 2, looking down; Fig. 4 is a longitudinal side elevation of one of my refrigerating molds, with a portion of the outer wall removed to show the interior construction; Fig. 5 is an end elevation of the mold shown in Fig. 4, taken on the line 5—5 in said Fig. 4; Fig. 6 is a diagrammatic illustration in perspective, of the mold shown in Figs. 4 and 5, disclosing the means provided to facilitate a circulation of the refrigerant between the walls of the mold; Fig. 7 is another diagrammatic view in perspective, of a portion of the mold illustrated in Fig. 6; Fig. 8 is a detailed view showing an end elevation of a portion of one of my molds in its relation to the means for circulating water there-through; Fig. 9 is a similar view of a mold intended for the simultaneous forming of two cakes of ice; Fig. 10 is a diagrammatic illustration in perspective of the mold for forming two cakes of ice, shown in Fig. 9; Fig. 11 is another diagrammatic illustration of the construction shown in Fig. 10, in side elevation; Fig. 12 is a vertical cross-sectional view of the can for forming two cakes of ice, taken on the line 12—12, in Fig. 9, and Fig. 13 is a detail view illustrating the means for disposing of brine, which may exude from any possible leak in the conduits therefor.

I deem it unnecessary to describe the means commonly used for chilling and circulating the refrigerant used in the production of artificial ice, as such apparatus is well understood by those conversant with the art. It is sufficient to state that I prefer to use chilled brine, and that any common means for forcing its circulation in the apparatus which I shall now describe, may be used in combination with an ordinary brine tank or cooling reservoir, where the heat may be taken from the brine or other refrigerant, in any manner heretofore commonly pursued.

My construction consists of a fluid-tight tank 1 covered with material non-conductice of heat, such as pitch, provided preferably with removable covers or lids, 2. In the bottom of the tank are fixed angled guides, 3, to receive and properly locate and space molds, 4, wherein the ice is to be formed. The tank, 1, is also provided with vertical partitions, 5, which co-act with the walls of the molds, 4, to provide proper channels for the circulation of water within the tank, 1. To enforce such circulation of the contents of the tank, I provide propellers, 6, mounted upon shafts, 7, passing through the wall of the tank, and which may be rotated by a pulley and belt, from any proper source of power. 8, 8, are headers, for conveying the refrigerant from the cooling reservoir to the ice molds, 4, with which they are connected by branch pipes, 9, and flexible connecting pipes, such as hose, 10, attached to the branch pipes, 9, by couplings, 11, and to pipes, 12, leading into the molds 4. At the other ends of the molds, 4, are the pipes, 13, connected by flexible pipes, 14, and unions, 15 and branch pipes, 16, which are in turn connected with return pipes, 17, leading back to the cooling reservoir for the refrigerant.

In describing the molds, 4, I shall refer first to the molds intended for the production of single blocks of ice, illustrated in Figs. 4, 5, 6 and 7 of the drawings. These molds are constructed of metal, with three walls, one within another, and with spaces intervening between the walls. The inner wall, 18, is formed with top, bottom and sides, to afford a mold of the diameters required for the blocks of ice to be formed therein, the ends of the mold being unenclosed. The walls, 19 and 20, are formed outside of the inner wall, 18, with intervening spaces, as indicated in Figs. 4, 5, and 6. The space between the walls, 19 and 20, is filled with material non-conductive of heat and cold, such as pitch, cork, or the like, while the ends of the space between the walls, 18 and 19, are closed by the wall, 21 (see Fig. 4), and the spaces between the walls, 18, 19 and 20, are closed at each end of the mold by walls, 21, and the space between the walls, 18 and 20, at each end of the mold, is filled with pitch or other non-conductive material, as shown at the left hand end of Fig. 4. Between the walls, 18 and 19, is formed a continuous partition, 22, which encircles or embraces in its turns, the wall, 18, from end to end, and forms a continuous, winding channel for the circulation of the refrigerant, about and in contact with the inner wall, 18, of the mold. The pipe, 12, conveys the brine or other refrigerant, through the outer and middle walls, 20 and 19, into the space between the walls, 18 and 19, and the current of refrigerant passes through the winding channel provided by the partition, 22, progressively, around the inner wall of the mold a number of times, in the direction indicated by arrows, and finds its exit through the pipe, 13, and is thence carried back to the cooling tank by the connections, 14, 16, and 17.

In the mold for simultaneously forming two cakes of ice, diagrammatically illustrated in Figs. 10 and 11, the same plan of construction is followed as that just described with reference to the mold for forming single ice blocks, but with a modification of the structure, which provides for the circulation of the refrigerant between the adjacent walls of the mold used for forming the two ice blocks. The inner wall, 23, of the double mold shown in Figs. 10 and 11, is embraced in the continuous winding partition, 24. A separate partition, 25, guides the refrigerant received through the pipe, 12 (shown in Fig. 4, but not in Fig. 10), down one side of the upper mold portion, in the direction of the arrows, and the current of refrigerant is thence deflected between the lower wall, 26, of the upper portion of the mold, and the upper wall, 27, of the lower portion of the mold, through a channel formed by the partition, 28, around the farther end of said partition, 28, in the course indicated by arrows, and back by the other side thereof, through an opening in the side wall of the mold, and thence around the mold in the winding channel formed by the partition, 24, as shown by the direction of the arrows, until it reaches the top of the farther end of the mold, where it is discharged through the pipe 13 (shown in Fig. 4, and not in Fig. 10), and is carried back to the cooling tank.

The molds thus described are placed in the tank, 1, in series, as indicated in Figs. 1 and 3, their regular adjustment to position being facilitated by the guides, 3, which not only serve to aid in properly positioning the molds, 4, but also prevent the circulation of water between the molds. The connection of the molds with the headers and return pipes for conveying the refrigerant, is then effected as hereinbefore described, and as indicated in Figs. 1 and 2. Fresh water is then admitted to the tank, 1, until it rises to a height therein at or slightly above to the tops of the several molds, 4. The covers, 2, are then placed over the tank, 1, and the refrigerant is turned on, and passes into the refrigerating jackets of the several molds, and being under continuous pressure, circulates within the walls of each mold through the channels formed by the continuous partitions above described, and is returned to the brine cooler in the common, well-known manner. Simultaneously the propellers, 6, are rotated at a proper speed, to cause a circulation of the water in the tank, 1, which water, as shown in Fig. 3, passes through the channel, 26, between the two rows of molds adjacent to the propeller, and through the open-ended molds, into the channels, 27 and 28, as indicated by arrows, from which the water flows through the channel, 29, into the channel, 30, and out of said channel, 30, through the two rows of molds placed at the sides thereof, into the channels, 31 and 32, and thence into the channel, 33, and back to the propeller, 6, which maintains the circulation of water through the course just described. As the water in the tank is thus continuously circulated through the several ice molds, and contacts with the inner walls of the molds, chilled by the refrigerant passing through the molds as described, the temperature of the water is gradually reduced to approximately thirty-two degrees Fahrenheit. Congelation on the exposed inner walls of the molds is quickly initiated and continues until a solid cake of ice fills each mold. The molds may then be removed from the tank by means of the bails, 34, and the molds may be sufficiently heated to permit of the ready removal of the ice blocks therefrom.

To cause an effective circulation of the water throughout the tank as described above, I prefer to use two propellers for a tank containing single ice molds, as indicated in Fig. 8, while in a tank fitted for the use of double ice molds, I prefer to use four propellers, as indicated in Fig. 9. Any seepage or drippings of brine from the headers or their connections, is taken up by the drip pans, 35, and discharged from the ends thereof, through pipes, 36, which may be connected with a sewer or with a storage receptacle for re-use. I may also control the flow of water into the tank, 1, automatically, by a valve in the supply pipe, 37, controlled by a float, 38.

As will be readily understood, the process of ice manufacture may be continuously carried on in an apparatus such as I have described, the float valve operating to cause the refilling of the tank with water to the requisite fixed depth when and as the water level may be lowered by the removal of the ice cakes and the molds containing them, while the process of congelation will be materially shortened, and the cakes of ice produced will be very clear with a very faint showing of core.

Having thus described my invention, I claim:

1. In ice-making apparatus, the combination of a tank adapted to contain water to be congealed; a portable ice-mold positioned within said tank and having uninclosed ends and double walls spaced apart, the outer wall having an exterior covering of matter non-conductive of heat and cold; conduits for a refrigerant; readily-detachable connections intermediate said conduits and the space between the walls of said ice-mold; and means for forcing a current of the water contained in said tank through the said ice-mold.

2. In ice-making apparatus, the combination of a tank adapted to contain water to be congealed; conduits for a refrigerant; a portable ice-mold having uninclosed ends and double walls spaced apart, the entire exterior wall being covered with matter non-conductive of heat and cold, said mold being positioned in said tank with its open ends disposed in a substantially horizontal plane; connections intermediate said conduits and the space between the double walls of said ice-mold; means for passing a current of the water contained in said tank through the said ice-mold, and means whereby said ice-mold may be removed from said tank to harvest the ice formed therein.

3. In ice-making apparatus, in combination, a plurality of individual ice-molds freely open at their ends and having double walls spaced apart for the passage of a refrigerant, the outer walls and ends thereof being exteriorly covered with matter non-conductive of heat and cold; a water-receptacle within which said ice-molds are positioned in series; supply and exit headers for the refrigerant extending along the opposite ends of the said ice-molds, said headers having valved branches for each ice-mold; inlet and outlet pipe-sections for each mold; and means for creating a gentle flow of water through the molds during the freezing operation.

4. Apparatus for making ice-blocks from undistilled water; comprising a tank for containing the water, a plurality of open-ended double-walled refrigerating molds located substantially horizontally in said tank, and means for creating a gentle flow of water through said molds, thereby preventing the accumulation of impurities in suspension in said water in the forming ice, while permitting the ice to form in the molds in close correspondence to the formation of natural ice in flowing streams.

5. An ice-making apparatus, provided with a series of individual ice molds freely open at their ends and having double walls spaced apart for the passage of a refrigerating liquid, a water receptacle within which said molds are arranged in series, each mold standing on one of its inclosed sides; means for creating a gentle horizontal flow of water through the molds during the freezing operation, supply and exit headers for the refrigerating liquid extending along the opposite ends of the molds, said headers having valved branches for each mold, and inlet and outlet pipe sections for each mold, joined to said valved branches by detachable couplings.

6. In ice-making apparatus, the combination of a tank adapted to contain water to be congealed, a series of portable ice-molds having uninclosed ends and double walls spaced apart exteriorly covered with matter non-conductive of heat and cold; conduits for a refrigerant; readily-detachable connections between said conduits and the spaces between the double walls of the respective ice-molds of said series; means for forcing a current of said refrigerant through the respective spaces between the double walls of the ice-molds of said series; and means for forcing a current of the water contained in said tank through the respective ice-molds of said series, simultaneously.

7. In ice-making apparatus, the combination of a tank adapted to contain water to be congealed, a series of portable ice-molds having uninclosed ends and double walls spaced apart and exteriorly covered with matter non-conductive of heat and cold, series of guides adapted for the emplacement of said molds with the uninclosed ends of each lying in a substantially horizontal plane and their sides in planes substantially parallel to each other; conduits for a refrigerant; readily-detachable connections intermediate said conduits and the spaces between the double walls of the respective ice-molds; means for forcing a current of refrigerant through the channel in the walls of each of said ice-molds; and means for forcing a current of the water in said tank through each of said molds.

8. In ice-making apparatus, a tank adapted to contain water to be congealed; series of portable ice-molds having uninclosed opposite ends, and having double walls spaced apart and exteriorly insulated from heat and cold; guides fixed upon the bottom of said tank adapted for the emplacement of said ice-molds in separated series on said bottom with their uninclosed ends so disposed as to receive and pass a current of the water in said tank; a series of conduits for a refrigerant; readily-detachable connections between said conduits and the spaces between the walls of said ice-molds, respectively; means for passing a current of refrigerant through the spaces between the walls of said ice-molds; means for forcing a current of the water in said tank through each of said ice-molds, and means for the ready removal of said ice-molds individually from said tank to harvest the ice formed in said molds.

9. In ice-making apparatus, a tank adapted to contain water to be congealed; series of portable ice-molds having uninclosed opposite ends, and having double walls spaced apart and exteriorly insulated from heat and cold; guides fixed upon the bottom of said tank adapted for the emplacement of said ice-molds in separated series on said bottom with their uninclosed ends so disposed as to receive and pass a current of the water in said tank; series of conduits for a refrigerant; readily-detachable connections between said conduits and the spaces between the walls of said ice-molds, respectively; means for passing a current of refrigerant through the spaces in the walls of said ice-molds; means for forcing a current of the water in said tank through each of said ice-molds, and means for the ready removal of said ice-molds individually from said tank to harvest the ice formed in said molds, and automatic means for replenishing the water in the tank as its level is lowered by the removal of an ice-mold or molds with the ice formed therein.

WILLIAM BLANKNER.

Witnesses:
CHARLES G. NISHEL,
SAMUEL JACOBSON.

Copies of this patent may be obtained for five cents each, by addressing the "Commissioner of Patents, Washington, D. C."